United States Patent [19]
Gudridge et al.

[11] Patent Number: 4,971,272
[45] Date of Patent: Nov. 20, 1990

[54] STRUCTURE FOR POSITIONING A CONDUIT

[75] Inventors: Joan M. Gudridge, Vernon; Clement A. Senatro, Newington; Wieslaw A. Chlus, Wethersfield, all of Conn.

[73] Assignee: United Technologies Corporation, Hartford, Conn.

[21] Appl. No.: 373,969

[22] Filed: Jun. 29, 1989

[51] Int. Cl.$^5$ ............................................. F16L 3/08
[52] U.S. Cl. .............................. 248/74.5; 24/17 AP; 248/74.3
[58] Field of Search .................... 248/74.3, 74.1, 74.2, 248/74.4, 74.5, 70, 71, 73, 65, 49; 24/277, 273, 17 AP

[56] References Cited

U.S. PATENT DOCUMENTS

| 2,445,481 | 7/1948 | Wertz | 248/74.3 |
| 3,581,349 | 6/1971 | Verspieren | 248/74.3 X |
| 4,441,677 | 4/1984 | Byerly | 248/74.3 |
| 4,490,888 | 1/1985 | Levant | 248/74.1 X |
| 4,570,303 | 2/1986 | Richmond et al. | 24/17 AP X |
| 4,709,889 | 12/1987 | Erickson | 248/74.3 X |
| 4,790,502 | 12/1988 | Saegusa | 248/74.1 |

Primary Examiner—Ramon O. Ramirez
Attorney, Agent, or Firm—Gene D. Fleischhauer

[57] ABSTRACT

A support structure 10 for positioning a conduit 12 for various environments including that of an aircraft gas turbine engine is disclosed. Various construction details are developed for the support structure which facilitate assembly of portions of the support structure. The support structure includes a clamp assembly 18 and a clip 22 for orienting the clamp assembly in the proper direction. Orientation of the clamp assembly is facilitated by features of the clip. These features include a pair of tabs 32, 34 which face each other from either side of the clamp assembly. In one detailed embodiment, the clamp includes a laterally extending tab 92 to block the channel formed between the pair of longitudinally extending tabs.

6 Claims, 4 Drawing Sheets

STRUCTURE FOR POSITIONING A CONDUIT

TECHNICAL FIELD

This invention relates to a support structure for positioning a conduit, such as electrical cables used with electronic fuel controls in gas turbine engines. This invention was developed in the field of axial flow gas turbine engine and has application to other fields in which a predetermined routing of conduits is an important consideration.

BACKGROUND

Modern gas turbine engines of the type used to propel aircraft employ a sophisticated electronic fuel control which is connected by electrical cables to various components of the engine. The cable provides a conduit for carrying signals which are used to adjust the operating parameters of the engine. The conduits follow a predetermined path to avoid abutting contact with other components of the engine which are disposed in the crowded nacelle or shelter which extends about the gas turbine engine. A conduit which does not follow the predetermined route may rub against adjacent structures causing early failure of the cable and a loss of signals which are necessary for the engine control to efficiently operate the engine. In addition, the cables are of a predetermined length. Cables which do not follow the predetermined routing may be unacceptably stretched to reach the necessary locations.

One approach is to attach clamp assemblies to the cable at predetermined locations to guide the conduit over a predetermined path. However, the clamp assemblies may be installed at correct locations but at orientations which are not acceptable and which incorrectly route the cable.

Accordingly, scientists and engineers working under the direction of Applicants' assignee are seeking to develop a device for correctly orienting clamp assemblies which are used to route conduits.

DISCLOSURE OF INVENTION

According to the present invention, a clip for orienting a clamp assembly for a conduit includes a pair of tabs which face each other and which are disposed on either side of the clamp assembly to correctly orient the clamp assembly during installation and to block rotation of the clamp assembly from the correctly aligned position during installation.

In accordance with one embodiment of the present invention, the clip includes a base, a pair of longitudinally extending tabs which form a channel for orienting the clamp assembly and a laterally extending tab to block the channel at one end.

In accordance with one detailed embodiment, the tabs are sloped to provide an unstable support surface for an incorrectly oriented clamp assembly and a turning moment or force couple during installation which twists the clamp assembly to make visually obvious the incorrect orientation of the clamp assembly.

In accordance with another detailed embodiment, the height of the tabs is such that a clamp assembly which engages two of the tabs is spaced away from a support member by a distance which prevents a fastener from attaching the clamp assembly to the support member, and, if the clamp assembly engages a tab but is deformed or incorrectly oriented to permit the fastener to engage the support structure, the fastener causes the clamp assembly to press against the shank of the fastener, increasing friction during installation to noticeably increase the torque required to turn the fastener.

A primary feature of the present invention is a clip for orienting a clamp assembly. The clip has a pair of longitudinally extending and laterally facing tabs which orient the clamp assembly. In one detailed embodiment, a feature is a third tab which extends laterally to block longitudinal movement of the clamp. Another feature is a fastener means, such as a bolt and a locknut, for attaching the clamp assembly to a support member. In one embodiment, the bolt having a head engages a locknut mounted to the support. The height of each of the tabs is such that a clamp assembly which engages the tabs prevents the shank of the bolt from engaging the locknut. In another embodiment, the gap between the bolt and holes for the bolt in the clamp assembly and in the clip cause the shank of the bolt to press against a clamp assembly which is angled with respect to the bolt. In one detailed embodiment, the tabs are sloped such that each tab has a top which is spaced longitudinally or laterally from the point where the bolt applies a force to the clamp assembly so that the bolt and tab apply a turning moment or force couple to an incorrectly oriented clamp assembly during installation. In one embodiment, the clamp assembly has an elastomeric sleeve. The clip has a base which extends to abuttingly engage the elastomeric sleeve on the clamp assembly.

In another detailed embodiment, a feature is tabs which are sloped relative to the direction in which torque is applied to the bolt to urge the clamp assembly to the correct orientation and to block the clamp assembly from moving away from a correctly oriented position as the turning bolt applies a frictional force to the clamp assembly.

A principal advantage of the present invention is the physical integrity of a conduit which results from avoiding contact with adjacent structure and unnecessary stretching of the conduit by correctly orienting the conduit with clips and clamp assemblies during installation. Another advantage is the avoidance of incorrect installation which results from the difficulty of installing a clamp incorrectly by increasing the force required to incorrectly install a clamp assembly, by preventing engagement of the parts if the parts are incorrectly aligned or by providing unstable mounting surfaces for incorrectly oriented clamp assemblies. Still another advantage in one embodiment is the fatigue life of the cable and its support structure which results from compressing an elastomeric sleeve on the clamp assembly with the clip to apply a damping force to vibrations in the support structure and the conduit and to isolate the conduit from vibrations in the support member for the clip.

The foregoing features and advantages of the present invention will become more apparent in light of the following detailed description of the best mode for carrying out the invention and in the accompanying drawings.

BEST MODE FOR CARRYING OUT THE INVENTION

Figure 1:
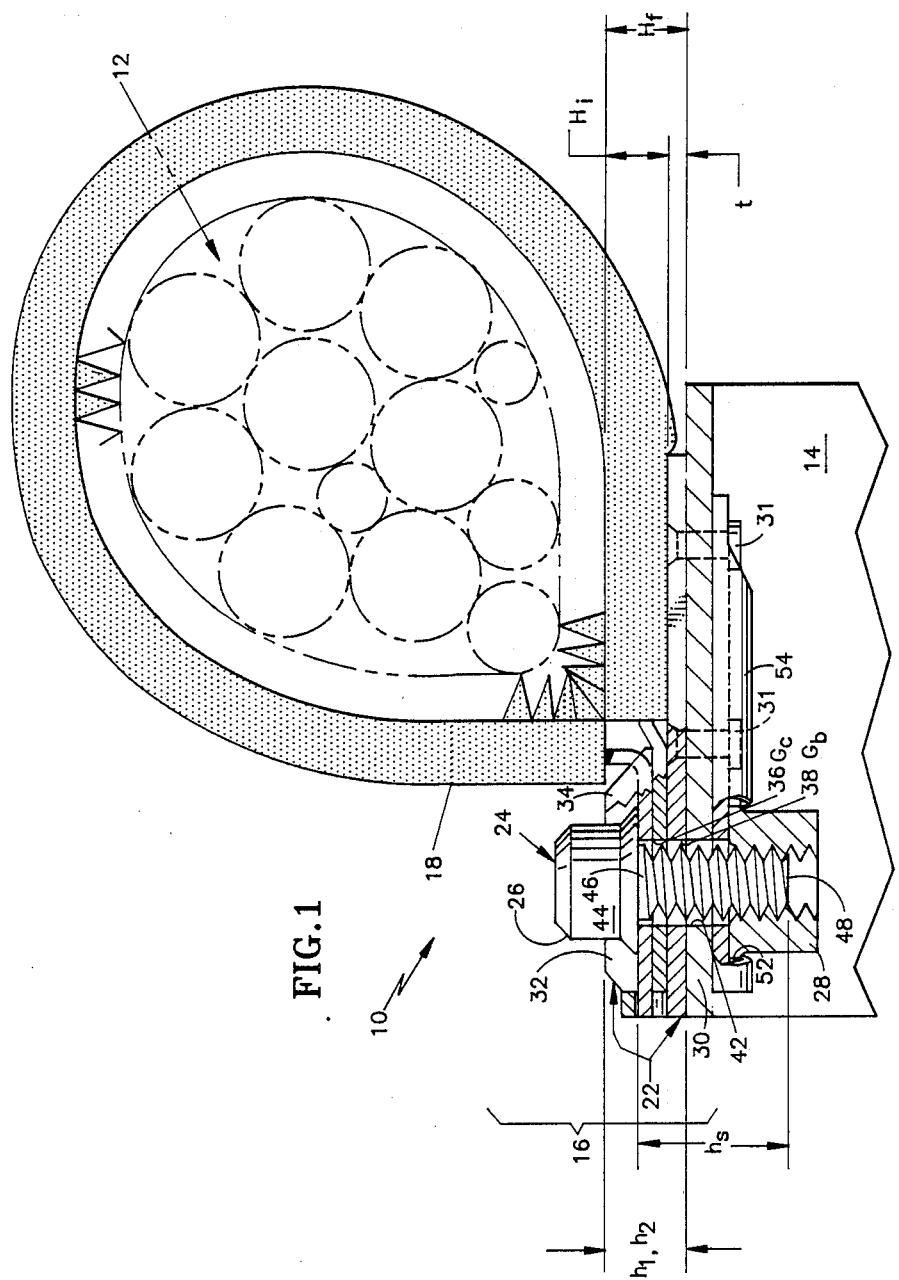
FIG. 1 side elevation view of a support structure for positioning a conduit which is partly in full and partly broken away to show a cross-sectional view of a portion of a clamp assembly, an orientation clip and a support member to which the orientation clip is attached.

FIG. 1 is a side elevation view of one embodiment of the present invention and shows a support structure 10 for a conduit 12. The support structure includes a support member 14 and support means 16 for positioning the conduit from the support member.

The support means includes a clamp assembly 18 which engages the conduit, a clip 22 attached to the support in member 14 for positioning the clamp assembly and fastener means 24. The fastener means is represented by the bolt 26 which is a fastener and the locknut 28, which is a fastener retainer. The bolt and locknut attach the clamp assembly to the clip.

The clip 22 has a base 30. The base is attached to the support member by rivets 31, or another suitable fastener or by bonding or welding. The base has thickness t. The clip has a pair of tabs 32,34, as represented by the first tab 32 and the broken away portion of the second tab 34, which have a height $h_1$ and a height $h_2$ and which extend longitudinally along the clip. The clamp assembly 18 is disposed between the two tabs.

A hole 36 through the clamp assembly 18, a hole 38 through the base of the clip, and a hole 42 through the support member 14 adapt these elements to receive the bolt 26. The bolt has a head 44 and a shank 46 having a threaded portion 48. The shank passes through the hole in the clamp assembly and is spaced from the clamp assembly leaving a gap $G_c$ therebetween. The shank passes through the hole in the base and is spaced from the base leaving a gap $G_b$ therebetween. The shank extends a distance $h_s$ from the head to the portion of bolt which first engages the locknut during assembly of the bolt to the nut. The height $h_1$ and $h_2$ of the tabs is predetermined such that a clamp assembly which engages the top of both tabs spaces the head of the bolt from the locknut with a distance that is greater than the distance $h_s$ from the head to the end of the bolt.

The fastener retainer or locknut 28 has wings 52 which adapt the locknut to slidably engage a C-shaped flange member 54 which is attached to the support member by the rivets which attach the clip. The fastener retainer slidably engages the flanged member. The locknut, retained in place by the flanges, is movable longitudinally with respect to the flanges to facilitate engagement with the shaft of the bolt during installation.

Figure 1B:
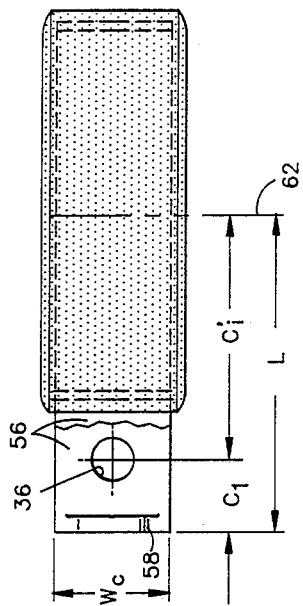
FIG. 1B is a view taken along the lines 1B—1B of FIG. 1A.
Figure 1A:
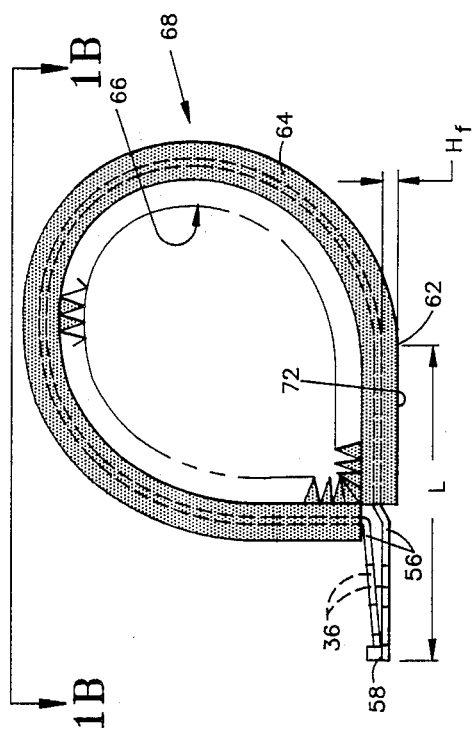
FIG. 1A is a side elevation view of the clamp assembly shown in FIG. 1 which has an outer sleeve of an elastomeric material that has a free height $H_f$ in the uninstalled condition.

As shown in FIG. 1A and 1B, the clamp assembly 18 includes a band 56 which adapts the clamp assembly to extend about the conduit 12. The band terminates at a first end 58 which has a lateral width $W_c$. The band extends with a longitudinal length L to a first point 62. The hole 36 extends through the clamp assembly and through the layers of the band to adapt the clamp assembly to receive the bolt 26. The middle of the hole is spaced from the first end by a distance $C_1$ and spaced from the first point by a distance $C'_1$.

An elastomeric sleeve 64 extends about the band 56. The elastomeric sleeve has an interior section 66 which is adapted to extend between the band and the conduit. The elastomeric sleeve has an exterior section 68 which extends from the band to abuttingly engage the base of the clip as is shown in FIG. 1. The exterior section has a free height $H_f$ measured from the band to the outer surface 72 of the sleeve. The exterior section has an installed height $H_i$ which is smaller than the free height $H_f$ by reason of being compressed by the base of the clip. In embodiments where the free height extends to the support member 14, the sleeve is compressed by thickness of the base and the installed height $H_i$ is equal to $H_f$-t.

Figure 2:
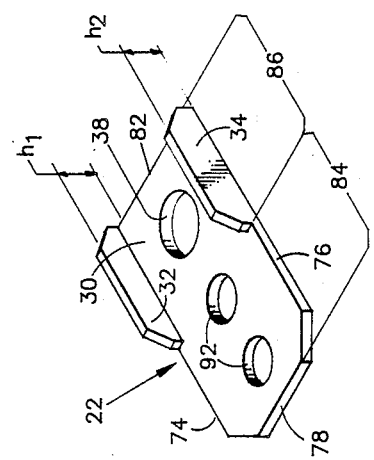
FIG. 2 is a perspective view of the clip shown in FIG. 1.

FIG. 2 is a perspective view of the clip 22 shown in FIG. 1 showing the relationship of the base 30 to the tabs 32,34. The base of the clip has a first side 74 and a second side 76 spaced laterally from the first side. The base has a first end 78 which extends laterally from the first side to the second side. A second end 82 is spaced longitudinally from the first end and extends laterally between the first side and the second side. The base has a first section 84 bounded by a portion of the two sides and the first end. The first section has two holes (92 which adapt the base to receive the rivets. As can be seen in FIG. 1, the first section of the base extends longitudinally and is an abutting relationship with the elastomeric sleeve.

A second section 86 is bounded by a portion of two of the sides 74,76 and the second end 82. The second section has the hole 38 which extends through the base to adapt the base to receive a fastener such as bolt 26.

Figure 3:
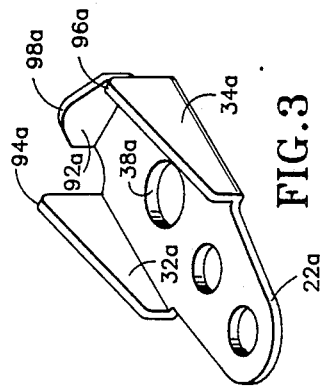
FIG. 3 is a perspective view of an alternate embodiment of the clip shown in FIG. 2.

FIG. 3 is an alternate embodiment 22a of the clip shown in FIG. 2 having a third tab 92a which extends laterally with respect to the two longitudinally extending tabs 32a,34a. The longitudinally extending tabs 32a,34a and the laterally extending tab 92a are sloped to a top of each tab, as represented by the tops 94a,96b,98a, which provides an unstable mounting surface for an incorrectly assembled clamp assembly 18.

Figure 4:
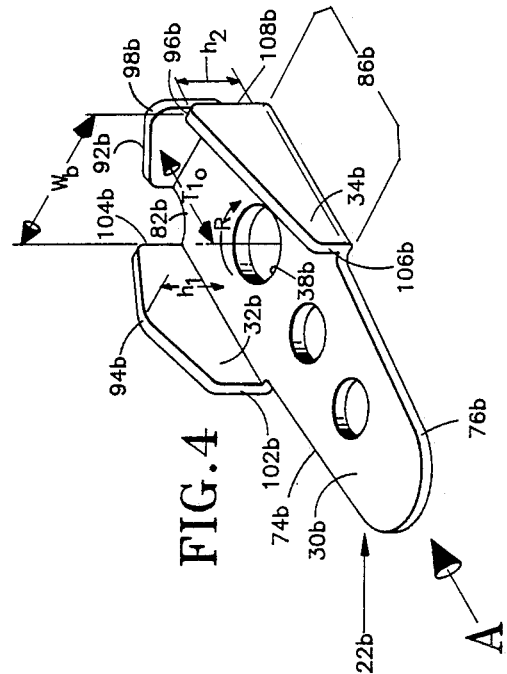
FIG. 4 is a perspective view of an alternate embodiment of the clip shown in FIG. 2.

FIG. 4 is an alternate embodiment 22b of the clip 22 shown in FIG. 2. The clip 22b has a first tab 32b extending longitudinally along and from the first side 74b of the second section 86b of the base 30b. The first tab has a top 94b which is spaced outwardly from the base by a distance $h_1$ and is sloped from either end 102B,104b of the tab to the top with an abrupt vertical surface at the first end 102b. The vertical surface faces opposite to the direction of rotation R of the bolt which extends through the hole of the clip. The second tab 34b faces the first tab 32b and extends longitudinally from the second side 76b of the second section. The second tab is spaced laterally from the first tab by a distance $W_b$ which is approximately equal to but slightly greater than the lateral width $W_c$ of the clamp assembly 18. This allows the two tabs to block lateral movement of the clamp.

The second tab 34b is sloped vertically from a low point at the end 106b adjacent the first section to the top 96b of the second tab at the second end 108b. The third tab 92b is spaced longitudinally from the middle of the hole 38b by a distance $T_{10}$ which is smaller than the distance $C'_1$ of the clamp assembly. The third tab extend from the second end 82b of the second section 86b and extends laterally across the base to block longitudinal movement of the clamp. The third tab is sloped vertically from a low point adjacent one side of the base to a top 98b which is adjacent to the other side of the base.

Figure 5:
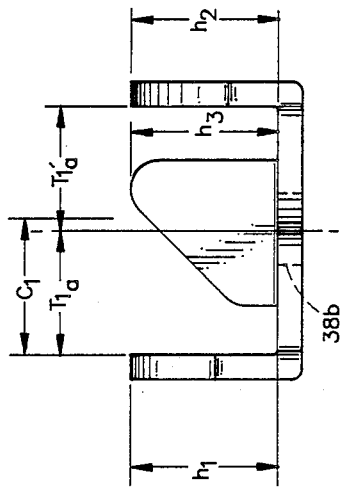
FIG. 5 is an end view in direction A of the clip shown in FIG. 4 which is partly schematic to show the relationship to the clip of one type of incorrectly installed clamp assembly.

FIG. 5 is an end view taken in the direction A of FIG. 4 showing the relationship of the clip 22b to a clamp assembly 18 which is incorrectly installed such that it engages at least one of the longitudinally extending tabs. The first tab 32b is spaced laterally from the middle of the hole 38b in the base 30b by a distance $T_{1a}$. This distance is smaller than the distance $C_1$ from the middle of the hole 36 in the clamp assembly to the end 58 of the clamp assembly. The second tab 34b is spaced laterally from the middle of the hole 38b in the base by a distance $T_{1a'}$ which is smaller than the distance $C_1$.

Figure 6:
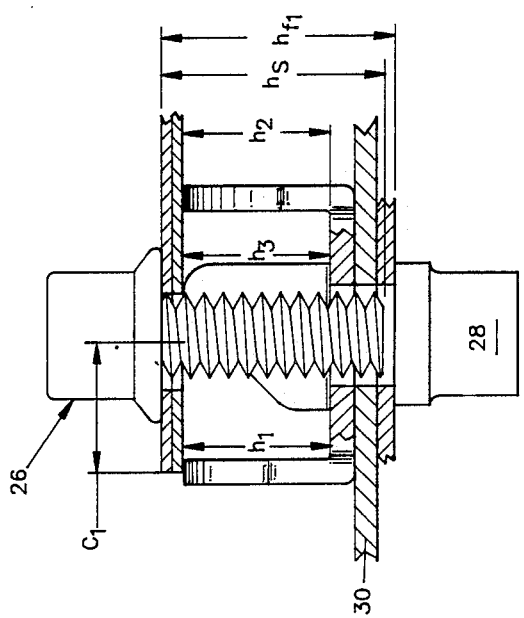
FIG. 6 is is a view corresponding to the view shown in FIG. 5 with a portion of the clip broken away for clarity and showing the relationship of another incorrectly installed clamp assembly to the clip.

As a result, and as shown in FIG. 6, if the hole 36 in the clamp assembly 18 is laterally and longitudinally aligned with the hole in the base 30, an incorrectly installed clamp assembly which engages one of the longitudinal tabs will also engage the other longitudinal tab. This will result in the clamp assembly obviously being mis-installed.

The first tab has a height $h_{1'}$ the second tab has a height $h_2$ and the third tab has a height $h_3$. The heights $h_1$, $h_2$ and $h_3$ are selected in relation to the fastener means 24. As a result, clamp assembly 18 that engages the two longitudinally extending tabs also positions the fastener such that the distance $h_{f1}$ from the head 44 of the fastener, such as the bolt 26, to the fastener retainer, such as the locknut 28, is greater than the distance $h_s$ from the head of the bolt to the end of the threaded portion of the bolt to prevent engagement of the bolt with the locknut.

Figure 7:
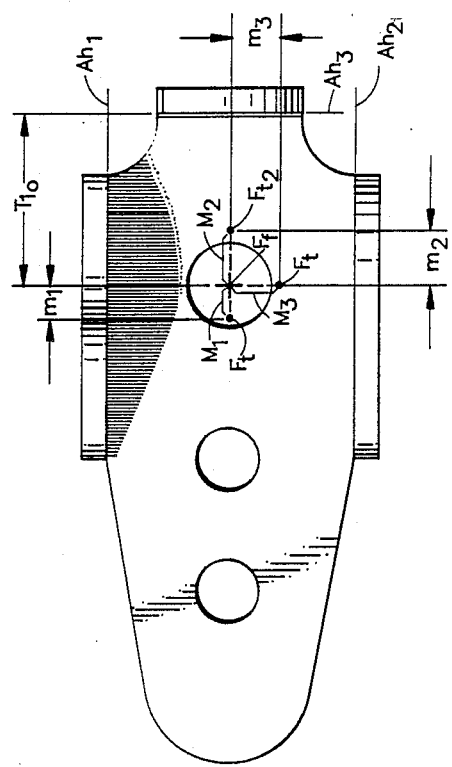
FIG. 7 is a top view of the clip shown in FIG. 5.

FIG. 7 is a top view of the clip 22b shown in FIG. 4. FIG. 7 shows the relationship of the top of each of the tabs 94b,96b,98b to the middle of the hole 38b in the base which accepts the fastener. The first tab is spaced longitudinally by a distance $M_1$ from the middle of the hole. As a result, an incorrectly installed fastener which is pivoted about the axis $A_{h1}$ of the first tab 94b by jamming an incorrectly installed clamp assembly down into the clip will cause the bolt 26 to exert a force $F_f$ acting at the middle of the hole on the clamp assembly and cause the tab to exert a force $F_{t1}$ which is laterally aligned with the top of the tab 94b causing a force couple or moment to twist the tab down and against the sloped surface of the tab.. The couple is designated as moment $M_1$. An incorrectly installed clamp assembly which pivots about axis $A_{h2}$ of the tab 96b will cause the tab, which is spaced a distance $m_2$ from the middle of the hole, to exert a turning movement $M_2$ as a result of the force $F_{t2}$ and the force $F_f$. The same result will occur for an incorrectly installed clamp assembly which is pivoted about the axis $A_{h3}$ of the third tab 92b, with forces acting at the center $F_f$ and at $F_{t3}$ and spaced apart by the distance $m_3$ to cause the force couple or moment $M_3$ which twists the incorrectly installed clamp assembly against the tab. Thus, the tops of the first tab and the second tab are spaced longitudinally from the middle of the hole 38b in the base and the top of the third tab is spaced laterally from the middle of the hole in the base to provide a turning moment which twists an incorrectly installed clamp assembly about the top of the tab as the fastener means engages a clamp assembly resting on one of the tabs causing an obvious misalignment of the clamp which is readily apparent upon a casual inspection of the installation.

Figure 8:
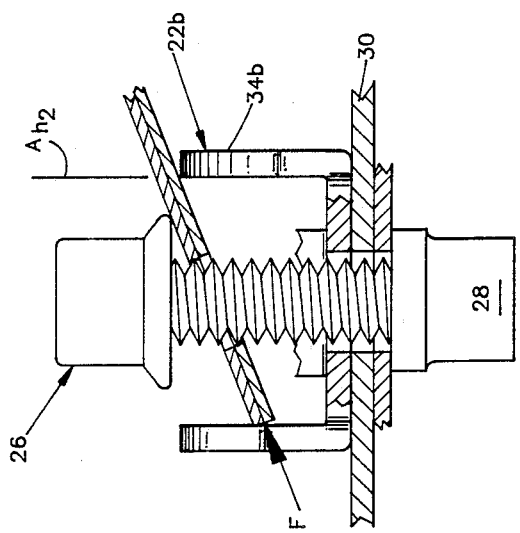
FIG. 8 is a view corresponding to the view shown in FIG. 5 with a portion of the clip broken away for clarity and showing the relationship of another incorrectly installed clamp assembly to the clip.

As illustrated in FIG. 8, a second result which alerts the installer to an incorrectly aligned clamp assembly occurs from providing a twisting moment to an incorrectly installed clamp. FIG. 8 shows an incorrectly installed clamp assembly jammed into the clip 22b by rotating the clip 22b about the line $A_{h2}$ of FIG. 6. The bolt 26 presses the clamp assembly 18 downwardly causing the clamp assembly, which is spaced from the fastener by the gap G, decrease the gap $G_c$ by reason of the angle of the clamp assembly until the clamp assembly presses against the shank 46 of the bolt. This exerts a frictional force on the bolt and makes torquing the bolt very difficult. This effect is increased by the turning moment which results from the sloped surfaces of the tabs and will cause additional engagement of the clamp assembly with the shaft of the bolt. In addition, in those constructions where the end 58 of the clamp assembly is spaced a distance $C_1$ from the hole in the clamp assembly which is much greater than the distance between the middle of the hole and the adjacent tab $T_{1a'}$ the first tab 32a will exert a force on the first end 58 of the clamp assembly, increasing the frictional forces acting against the fastener. This force will signal the installer that the clamp assembly is incorrectly oriented and allow corrective action to be taken.

As a result of having clips which incorporate one or more of the features shown in the clip illustrated in FIG. 4, the clips provide a relatively foolproof installation for a clamp assembly and results in conduits which are correctly oriented, thus increasing the physical integrity of the conduit in environments where a misrouting of the conduit can cause undue wear or stretching of the conduit. The difficulty of incorrect installation of a clamp assembly is increased by each of the features that are described. The FIG. 4 embodiment combines several features which make it very difficult to incorrectly install a clamp assembly to a clip. An incorrectly installed clamp assembly will have a twisted appearance which is easily detected by an inspector.

Finally, the base of the clip exerts a compressive force on the elastomeric sleeve to provide damping to the conduit and to the support member and to provide additional isolation of the clamp assembly from vibrations in the support member.

Although the invention has been shown and described with respect to detailed embodiments thereof, it should be understood by those skilled in the art that various changes in form and detail thereof may be made without departing from the spirit and the scope of the claimed invention.

We claim:

1. A support structure for positioning a conduit which comprises:
   a support member;
   a clamp assembly which includes
      a band which adapts the clamp assembly to extend about the conduit, the band terminating at a first end which has a lateral width $W_c$ and extends with a longitudinal length L to a first point, and having a hole having a middle extending therethrough to adapt the clamp to receive a fastener means, the middle of the hole being spaced from the first end by a distance $C_1$ and being spaced from the first point by a distance $C'_{1'}$ and, an elastomeric sleeve which extends about the band having an interior section which is adapted to extend between the band and the conduit and an exterior section having a free height $H_f$ measured from the band to the outer surface of the sleeve and an installed height $H_i$ which is smaller than the free height $H_f$;

a clip attached to the support for positioning the clamp assembly which includes a base having a thickness t, the base having a first side, a second side spaced laterally from the first side, a first end which extends laterally from the first side to the second side and a second end spaced longitudinally from the first end which extends laterally between the sides, the base further having a first section bounded by a portion of two sides and the first end, and a second section bounded by a portion of two sides and the second end, the second section having a hole extending through the base which has a center and which adapts the base to receive a fastener means, the first section of the base extending longitudinally and in abutting relationship with the elastomeric sleeve and compressing the free height $H_f$ of the sleeve to the installed height $H_i$ a first tab extending longitudinally from the first side of the second section of the base, the first tab being spaced laterally from the middle of the hole in the base by a distance $T_{1a}$ which is smaller than the distance $C_{1'}$ a second tab which extends longitudinally from the second side of the second section and which faces the first tab, the second tab being spaced laterally from the middle of the hole in the base by a distance $T_{1a}'$ which is smaller than the distance $C_{1'}$ the second tab being spaced from the first tab by a distance $W_b$ which is approximately equal to but slightly greater than the lateral width $W_c$ of the end of the clamp to block lateral movement of the clamp, fastener means which includes a fastener and a fastener retainer, the fastener extending through the hole in the clamp assembly and the base for urging the clamp assembly against the base of the clip, the fastener means having a head, a shank disposed in the hole of the band which is spaced from the band leaving a gap $G_c$ therebetween and, which is disposed in the hole in the base leaving a gap $G_b$ therebetween, the shank extending a distance $h_s$ from the head to the portion of the fastener which first engages the fastener retainer;

wherein a fastener means which extends through the hole in the base and the hole in the clamp assembly positions a clamp assembly which engages one of the longitudinally extending tabs such that the end of the clamp assembly engages the top of the other longitudinally extending tab.

2. The support structure of claim 1 wherein the first tab has a height $h_1$ and the second tab has a height $h_2$ wherein the heights $h_1$, $h_2$ of the tabs are such that a clamp assembly which engages two tabs positions the fastener such that the distance from the head of the fastener to the fastener retainer is greater than the distance from the head of the fastener to the end of the portion of the fastener which engages the fastener retainer to avoid engagement of the fastener and the fastener retainer.

3. The support structure of claim 1 wherein the first tab has a top which is spaced outwardly from the base by a distance $h_1$ and being sloped to the top, the second tab having a top which is spaced outwardly from the base by a distance $h_2$ and being sloped to the top, wherein the structure further has a third tab spaced longitudinally from the middle of the hole by a distance $T_{1o}$ which is smaller than the distance $C_1'$ of the clamp assembly, the third tab extending from the second end of the second section and extending laterally across the base to block longitudinal movement of the clamp, the third tab having a top which is spaced outwardly from the base by a distance $h_3$ and being sloped to the top;

wherein the top of the first tab and the second tab are each spaced longitudinally from the middle of the hole in the base and the top of the third tab is spaced laterally from the middle of the hole in the base to provide a turning moment to twist the clamp assembly about the top as the fastener means engages a clamp assembly which engages on one of said tabs;

wherein the gap G and G' are sized such that an incorrectly installed clamp assembly that pivots about one tab is forced against the shaft of the fastener to increase friction between the fastener means and the clamp assembly as the fastener urges the clamp assembly toward the base.

4. A support structure for positioning a conduit which comprises:

a support member;

a clamp assembly which includes a band which adapts the clamp assembly to extend about the conduit, the band terminating at a first end which has a lateral width $W_c$ and extends with a longitudinal length L to a first point, and having a hole having a middle extending therethrough to adapt the clamp to receive a fastener means, the middle of the hole being spaced from the first end by a distance $C_1$ and being spaced from the first point by a distance $C'_{1'}$ and, an elastomeric sleeve which extends about the band having an interior section which is adapted to extend between the band and the conduit and an exterior section having a free height $H_f$ measured from the band to the outer surface of the sleeve and an installed height $H_i$ which is smaller than the free height $H_f$;

a clip attached to the support for positioning the clamp assembly which includes a base having a thickness t, the base having a first side, a second side spaced laterally from the first side, a first end which extends laterally from the first side to the second side and a second end spaced longitudinally from the first end which extends laterally between the sides, the base further having a first section bounded by a portion of two sides and the first end, and a second section bounded by a portion of two sides and the second end, the second section having a hole extending through the base which has a center and which adapts the base to receive a fastener means, the first section of the base extending longitudinally and in abutting relationship with the elastomeric sleeve and compressing the free height $H_f$ of the sleeve to the installed height $H_{f'}$ a first tab extending longitudinally from the first side of the second section of the base, the first tab being spaced laterally from the middle of the hole in the base by a distance $T_{1a}$ which is smaller than the distance $C_{1'}$ the first tab having a top which is spaced outwardly from the base by a distance $h_1$ and being sloped to the top, a second tab which extends longitudinally from the second side of the second section and which faces the first tab, the second tab being spaced laterally from the middle of the hole in the base by a distance $T_{1a}'$ which is smaller than the distance $C_{1'}$ the second tab being spaced from the first tab by a distance $W_b$ which is approximately equal to but slightly greater than the lateral width $W_c$ of the end of the clamp to block lateral movement of the clamp, the second tab having a top which is spaced outwardly from the base by a distance $h_2$ and being sloped to the top, a third tab spaced longitudinally from the middle of the hole by a distance $T_{1o}$ which is smaller than the distance $C'_1$ of the clamp assembly, the third tab extending from the second end of the second section and extending laterally across the base to block longitudinal movement of the clamp, the third tab having a top which is spaced outwardly from the base by a distance $h_3$ and being sloped to the top; and, fastener means which includes a fastener and a fastener retainer, the fastener extending through the hole in the clamp assembly and the base for urging the clamp assembly against the base of the clip, the fastener means having a head, a shank disposed in the hole of the band which is spaced from the band leaving a gap $G_c$ therebetween and, which is disposed in the hole in the base leaving a gap $G_b$ therebetween, the shank extending a distance $h_s$ from the head to the portion of the fastener which first engages the fastener retainer;

wherein the top of the first tab and the second tab are each spaced longitudinally from the middle of the hole in the base and the top of the third tab is spaced laterally from the middle of the hole in the base to provide a turning moment to twist the clamp assembly about the top as the fastener means engages a clamp assembly which engages on one of said tabs;

wherein the gap G and G' are sized such that an incorrectly installed clamp assembly that pivots about one tab is forced against the shaft of the fastener to increase friction between the fastener means and the clamp assembly as the fastener urges the clamp assembly toward the base wherein a fastener means which extends through the hole in the base and the hole in the clamp assembly positions a clamp assembly which engages one of the longitudinally extending tabs such that the end of the clamp assembly engages the top of the other longitudinally extending tab;

wherein the heights $h_1$, $h_2$, $h_3$ of the tabs are such that a clamp assembly which engages two tabs positions the fastener such that the distance from the head of the fastener to the fastener retainer is greater than the distance from the head of the fastener to the end of the portion of the fastener which engages the fastener retainer to avoid engagement of the fastener and the fastener retainer;

5. The support structure of claim 4 wherein the fastener means is a bolt which engages a locknut, and wherein the second tab is sloped in the torquing direction toward the base to allow rotation of an incorrectly installed clamp assembly toward the base.

6. A clip for positioning a clamp assembly, which comprises:

a base having a thickness t, the base having a first side, a second side spaced laterally from the first side, a first end which extends laterally from the first side to the second side and a second end spaced longitudinally from the first end which extends laterally between the sides, the base further having a first section bounded by a portion of two sides and the first end, and a second section bounded by a portion of two sides and the second end, the second section having a hole extending through the base which has a center and which adapts the base to receive a fastener means, a first tab extending longitudinally from the first side of the second section of the base, the first tab being spaced laterally from the middle of the hole in the base by a distance $T_{1a'}$ the first tab having a top which is spaced outwardly from the base by a distance $h_1$ and being sloped to the top, a second tab which extends longitudinally from the second side of the second section and which faces the first tab, the second tab being spaced laterally from the middle of the hole in the base by a distance $T_{1a'}$, the second tab having a top which is spaced outwardly from the base by a distance $h_2$ and being sloped to the top, a third tab spaced longitudinally from the middle of the hole by a distance $T_{1o'}$ the third tab extending from the second end of the second section and extending laterally across the base, the third tab having a top which is spaced outwardly from the base by a distance $h_3$ and being sloped to the top.

* * * * *

UNITED STATES PATENT AND TRADEMARK OFFICE
CERTIFICATE OF CORRECTION

PATENT NO. : 4,971,272
DATED : November 20, 1990
INVENTOR(S) : Gudridge et al

It is certified that error appears in the above-identified patent and that said Letters Patent is hereby corrected as shown below:

Col 7, line 7, "$C'_1,$" should read -- $C'_1,$ --

Col 7, line 32, "$H_i,$" should read -- $H_i,$ --

Col 7, line 37, "$C_1,$" should read -- $C_1,$ --

Col 7, line 43, "$C_1,$" should read -- $C_1,$ --

Col 8, line 47, "$C'_1,$" should read -- $C'_1,$ --

Col 9, line 9, "$C_1,$" should read -- $C_1,$ --

Col 9, line 17, "$C_1,$" should read -- $C_1,$ --

Signed and Sealed this

Twenty-ninth Day of June, 1999

Attest:

Q. TODD DICKINSON

*Attesting Officer*  *Acting Commissioner of Patents and Trademarks*